(12) United States Patent
Rao

(10) Patent No.: US 6,406,813 B2
(45) Date of Patent: *Jun. 18, 2002

(54) LEAD-ACID SEPARATORS AND CELLS AND BATTERIES USING SUCH SEPARATORS

(75) Inventor: Purushothama Rao, Aurora, IL (US)

(73) Assignee: GNB Technologies, Inc., Mendota Heights, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,494

(22) Filed: Apr. 2, 1999

(51) Int. Cl.$^7$ ................................. H01M 2/16
(52) U.S. Cl. ................... 429/142; 429/144; 429/145; 429/247; 429/225
(58) Field of Search ................... 429/225, 218.1, 429/247, 249, 129, 146, 142, 144, 145

(56) References Cited

U.S. PATENT DOCUMENTS

| | | | | |
|---|---|---|---|---|
| 4,298,668 A | * | 11/1981 | Schmidt et al. | 429/250 |
| 4,391,036 A | * | 7/1983 | Kishimoto et al. | 29/623.2 |
| 4,588,663 A | * | 5/1986 | Mason et al. | 429/54 |
| 5,250,372 A | * | 10/1993 | Willmann et al. | 429/146 |
| 5,468,572 A | * | 11/1995 | Zguris et al. | 429/247 |
| 6,120,939 A | * | 9/2000 | Whear et al. | 429/254 |

* cited by examiner

Primary Examiner—Stephen Kalafut
Assistant Examiner—R Alejandro
(74) Attorney, Agent, or Firm—Morrison & Foerster LLP

(57) ABSTRACT

A sealed lead-acid cell utilizes a separator made with modified plastic microfibers having a contact angle of no more than 1.5° to the sulfuric acid electrolyte used and having a diameter of 1.1 to 5.0$\mu$, the separator having a porosity of 87 to 94%, a surface area of 1.0 to 2.2 meters$^2$/gm., and a maximum pore diameter of 8 to 20$\mu$ and a mean pore diameter of 1.2 to 5.0$\mu$.

2 Claims, 2 Drawing Sheets

LEAD-ACID SEPARATORS AND CELLS AND BATTERIES USING SUCH SEPARATORS

FIELD OF THE INVENTION

This invention relates to lead-acid cells and batteries and, more particularly, to separators used in making such cells and batteries.

BACKGROUND OF THE INVENTION

A wide variety of applications, often termed "industrial battery" applications, utilize conventional, flooded electrolyte lead-acid cells and batteries, or sealed lead-acid cells and batteries, often termed VRLA cells and batteries ("valve-regulated lead-acid"). In stationary battery applications, the lead-acid cells and batteries provide stand-by power in the event of a power failure. For this type of application, such cells and batteries are maintained at a full state-of-charge and in a ready-to-use condition, typically by floating at a constant preset voltage. This voltage is in the range of 2.25 to 2.35 volts per cell to maintain the cells in a full state-of-charge while minimizing positive grid corrosion and electrolyte water loss. Stationary batteries are used for stand-by or operational power in a wide variety of applications, including, by way of illustration, telecommunications, utilities, for emergency lighting in commercial buildings, as stand-by power for cable television systems, and in interruptible power supplies for computer back-up power and the like.

Other applications in which lead-acid cells and batteries may be used involve a variety of motive power applications in which an array of cells or batteries provides the motive power for vehicles ranging from Class 1 to Class 3 trucks, various automated guided vehicles, mining vehicles and also railroad locomotives. The performance requirements for motive-power vehicles are quite different from the performance requirement for stationary power sources. In stationary power applications, the depth of discharge in service is relatively shallow, and the number of discharges encountered per unit time are fewer, as most batteries are in float service most of the time. In direct contrast, motive power applications require a relatively higher (i.e., deeper) depth of discharge to be achieved on a continuous cycling basis over a period of time, and while repeating such discharges on a continual basis. Indeed, a common requirement for Class 1–3 trucks is that, in an 8-hour shift, the cell or battery assembly must be capable of delivering an 80% depth of discharge and that performance is required for 300 cycles per year with a useful service life under those conditions of 4 or 5 years.

The widely varying requirements for these many applications have presented substantial problems and an extremely challenging environment in the design and the manufacture of lead-acid cells and batteries. This environment has resulted in, to a large extent, custom designs which satisfy particular applications.

As a consequence, lead-acid cell/battery manufacturers have had to develop families of cells and batteries in an attempt to satisfy the diverse electrical performance criteria. Such criteria vary widely, often requiring large cells connected in parallel, series, or both, to provide a satisfactory power/energy source.

The space requirements often are also quite constricted, with closely defined dimensional requirements. Many types of steel trays and the like are used to house the cells required.

To achieve the family of cells and batteries requires positive and negative grids of various sizes so that the capacity and other electrical performance requirements for an individual cell for a particular application can be satisfied. One approach utilized for VRLA cells has been to provide a series of grids having essentially constant width while varying the height of an individual grid and the number of plates used in a particular cell to achieve a variety of capacity levels or gradations and other electrical performance requirements. While an effective solution, this approach does create challenges that have to be addressed, as will be discussed hereinafter.

The internal configuration of as such VRLA cells can vary widely. In general, such cells are disclosed in U.S. Pat. No. 3,362,861 to McClelland et al. As is thus known, such cells utilize highly absorbent separators; and all of the necessary electrolyte is absorbed within the separators and plates. Such cells are normally sealed from the atmosphere by a valve designed to regulate the internal pressure within the cell so as to provide what is termed an effective "oxygen recombination cycle" (hence, the use of the terms "sealed" and "valve-regulated" as well as "recombinant").

Recombinant battery separator materials (sometimes termed "RBSMs") have traditionally comprised a highly absorbent glass microfiber mat. Separators of this type have adequate absorbency to hold the amount of electrolyte desired within the small pores and possess some vacancy of pores to allow the oxygen recombination cycle to proceed. A wide variety of suitable glass fiber mats are commercially available and are in use in VRLA cells and batteries. Glass microfiber is made from a borosilicate glass using a flame attenuation process that produces a microfiber with a diameter in the range from 0.25 to 4 $\mu$m, and with a typical length of 0.8–1.5 $\mu$m. These fibers have the consistency of cotton wool and are processed into a continuous porous sheet-form by a wet laying process on a paper-making machine. Typically, the glass microfiber mat will have a high porosity in the range of 85–95%, and this porosity contributes to the high electrolyte retention.

Despite the widespread use of such glass fiber mats, substantial efforts have been made to develop other recombinant battery separator materials, perceived to satisfy varying objectives. U.S. Pat. No. 4,908,282 to Badger summarizes many different prior art attempts to provide satisfactory separator materials for recombinant cells and batteries. Yet, Badger states that there has not previously been a suggestion of a separator which, when saturated with the electrolyte, leaves a residuum of unfilled voids through which a gas can transfer from one plate to another because the separator is not capable of holding an amount of electrolyte which is sufficient to fill all the voids (col. 2, 11. 20–26).

More particularly, Badger discloses a separator having, in general, two types of fibers. A first set of fibers imparts to the separator an absorbency greater than 90% relative to the electrolyte and a second set of fibers that have a different absorbency which is less than 80% relative to the electrolyte. The first and second fibers are disclosed as being present in proportions such that the absorbency of the overall separator is from 75–95%. Specifically, a separator is disclosed which is made of a mixture of two different grades of glass fibers, one grade of chopped glass strand and a certain grade of polyethylene fibers.

Another prior art attempt to provide a RBSM is U.S. Pat. No. 4,216,280 to Kono et al. The '280 patent discloses separators which comprise glass fibers entangled in the shape of a sheet without the use of a binder and have a first and second portion of glass fibers. The first portion comprises glass fibers having a fiber diameter smaller than one micron; and a second portion uses glass fibers having a fiber diameter larger than 5 microns, as well as an average fiber length of at least 5 millimeters. Such separators are stated to have high electrolyte retention, good mechanical strength, and good shape recovery.

Yet another prior art attempt to provide RBSMs is U.S. Pat. No. 4,367,271 to Hasegawa et al. By way of background, the '271 patent thus states that one prior proposal comprises a glass fiber mixed with a synthetic resin serving as a binding agent, while another type proposed involves mixing a glass fiber with a synthetic resin monofilament fiber. Hasegawa et al. state that such prior approaches are inadequate because these approaches suffer a remarkable decrease in liquid absorption and that the improvement in the mechanical strength is small. The '271 patent is said to provide a separator which is high in liquid absorption, high in strength, and is easy to handle. Such separator materials, according to the '271 patent, are produced by a process which uses glass fiber substantially 1 $m^2/g$ or more in specific area, mixed with about 10% or less, by weight, of fibril-formed synthetic fibers which have 350 cc or less in "freeness."

Still further, there are significant problems that arise during the service life of VRLA cells and batteries, particularly when the required service life is relatively long, that need to be overcome. First of all, as has been previously noted, one approach in this field provides a family of cells and batteries which utilizes grids of a constant width while the height of the grid is varied as well as a number of plates to provide the desired capacity and other electrical performance requirements. In cells of this type, and, indeed, in many cells that have a relatively large height, cell "dry out" due to rapid water loss from the electrolyte can become a prevalent problem, particularly, in industrial cells designed for a relatively long service life, e.g., 10 or 20 years or so. Such "dry out" can result from electrolyte loss, loss of intimate contact between the separators and the positive and negative plates or a combination of the two. Among the reasons for occurrence of "dry out" may include lack of appropriate resilience of the absorbent separator and/or formation of an electrolyte saturation differential from cell top to cell bottom. In addition, electrolyte stratification can cause a variety of problems such as sulfation of the negative plate and uneven usage of the plate from top to bottom.

Another problem, which perhaps may be related to cell dry out, is the loss of appropriate overall cell compression. More particularly, as is known, providing satisfactory electrical performance in VRLA cells requires intimate contact between the cell plates and the separators. Such contact is typically provided by compressing the separators by as much as 20% or more (based on their uncompressed thickness) in the cell so as to facilitate maintaining the necessary contact between separators and plates throughout cell life. What is not appreciated is the substantial changes that take place in the microglass fiber separator upon such compression. The porosity and surface area of an absorbent glass fiber mat may change dramatically with such levels of compression. Further, even with such compression, it is being discovered that absorbent glass fiber mats cannot sustain the needed compression throughout a long service life, resulting in premature cell or battery failure.

Another problem stemming from the use of absorbent glass fiber mats is their relatively low stiffness and mechanical strength. Such properties increase the susceptibility to separator damage during cell or battery assembly. Such damage could create internal shorts and lead to premature battery failure.

Despite these shortcomings and the considerable efforts in this field to achieve more desirable RBSM, absorbent glass fiber mats remain the material of choice for commercial VRLA cells and batteries. There certainly exists a clear need for improved separator materials, and for VRLA cells and batteries that can sustain the necessary electrical performance over the desired service life.

It is accordingly a principal object of the present invention to provide sealed lead-acid cells and batteries utilizing separators capable of enhancing the electrical performance over the service life of such cells and batteries.

A further and more specific object provides separators for large VRLA cells and batteries capable of maintaining higher resiliency and stable spring back characteristics in both dry- and acid-saturated conditions so as to maintain sustained pressure against the cell or battery plates in service.

Yet another specific object of this invention lies in the provision of such sealed cells and batteries having separators with improved thickness stability under varying magnitudes of separator compression and acid saturation.

Another object of the present invention is to provide separators for such sealed lead-acid cells and batteries exhibiting enhanced mechanical strength so as to facilitate cell and battery assembly.

A still further object lies in the provision of VRLA separators having good electrolyte wettability.

Other objects and advantages of the present invention will become apparent as the following description proceeds. While the present invention will be described primarily with respect to use in sealed lead-acid cells, it should be appreciated that the present invention can be advantageously used in any other application where separators of the type disclosed may find utility.

SUMMARY OF THE INVENTION

The present invention is, in general, predicated on the discovery that superior separators can be provided by utilizing a microfiber mat having at least 40% by weight modified polymeric microfibers and the balance, if any, comprising glass microfibers. It should be kept in mind that the same weight proportions, in a given weight of such modified polymeric microfibers, will yield a thicker separator than with equivalent weight-glass microfibers as the density of polymers is in the range of 0.95–1.2 g/cc, while that of glass is in the range of 2.0–2.5 g/cc. By suitably modifying such polymeric microfibers and by selection of appropriate characteristics, as will be discussed hereinafter, absorbent microfiber mats can be provided which, in comparison to glass mats, have improved mechanical properties for handling, assembly and service reliability and durability, which also achieve desirable thermal and electrochemical stability, oxidation resistance, superior resiliency and stable spring-back attributes among other characteristics.

Another aspect of the present invention utilizes a multi-layered mat with at least one microfiber glass layer and one modified polymeric microfiber layer. In a preferred embodiment, the multilayered mat comprises two outer thin glass mats and a center polymeric layer.

DETAILED DESCRIPTION OF THE INVENTION

Figure 1:
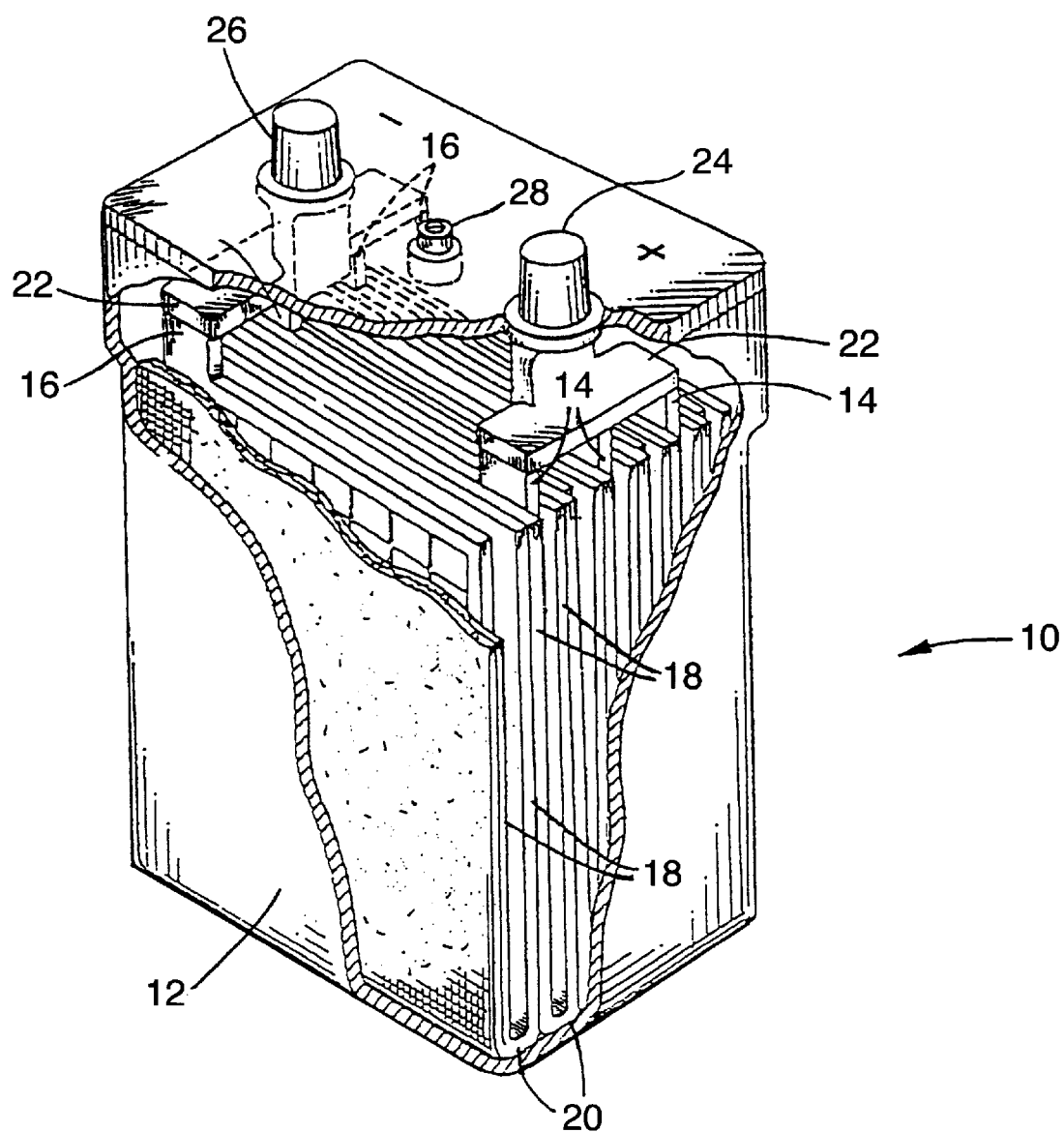
FIG. 1 is an isometric view of a lead-acid cell of the present invention, the cell jar being partially broken away to show the internal components.

FIG. 1 illustrates an exemplary lead-acid cell in accordance with the present invention. The cell 10 has a container or jar 12 containing a plurality of positive and negative plates 14 and 16, respectively. As illustrated, the cell contains plural positive and negative plates. Of course, the cell can utilize the necessary number of plates to provide the capacity and other electrical performance characteristics desired for the particular application.

In accordance with the present invention, the plates 14, 16 are separated by absorbent separators 18 as will be discussed hereinafter. In the preferred embodiment, the separator extends slightly past the electrode to prevent an inadvertent short circuit of the cell. In addition, the separator may be folded around and between the plates by employing a U-fold 20, as illustrated in FIG. 1.

The plates 14, 16 preferably fit snugly within the container 12, that is, the electrodes and separators should stay in the assembled condition when the container is inverted. Indeed, as is known, the cell configuration should ensure that the plates and separators maintain adequate compression and good contact so as to enhance the electrical performance of the cell. Preferably, as illustrated in FIG. 1, the separators and plates are compressed so as to be in intimate contact with one another. Suitably, adequate compression can be achieved by ensuring that the thickness of the separator in the cell is compressed typically by at least about 20% to 25% or so of the uncompressed thickness. The plates are connected to one another by conductive straps 22 and to external terminals, 24, 26, by conventional means.

The thickness of the plates will vary depending upon the application to which the cell is intended. An illustration of a useful range is from about 0.050 inch to about 0.300 inch, or even more.

Preferably, the container is normally sealed from the atmosphere in use to provide an efficient oxygen recombination cycle as is known. The container utilized should be able to withstand the pressure of the gases released during charging of the cell. Pressures inside the container may reach levels as high as, for example, 0.5–10 psig. Release venting is provided by a low pressure, self-resealing relief valve, such as for example, a valve 28. An example of such valve is illustrated in U.S. Pat. No. 4,401,730.

An electrolyte is also included within the container 12. Preferably, all the electrolyte is absorbed within the separator and in the positive and negative active material. The electrolyte typically is sulfuric acid having a specific gravity in the range of, as an example, about 1.270 to about 1.340 or even more, as is considered appropriate for a particular application.

The size of the plates can vary depending upon the necessary electrical performance requirements for the cell. For example, conventional sizes of positive plates are rated ranging from 58 ampere-hours (AH) to 98 AH, 108 AH, 188 AH, and even greater.

As illustrative examples, the height of the cell can exceed 28 inches. Indeed, the cells for many applications, require separators having thicknesses of from about 0.040 to about 0.135 inches and up to 28 inches in height, or perhaps even more.

As may be appreciated, consistent with utilizing separators having the characteristics of the present invention, the internal configuration of the sealed lead-acid cells and batteries can be varied as desired. A wide variety of types of sealed lead-acid cells and batteries are known and may be used.

What has been found pursuant to the present invention is that certain characteristics and properties of the separator materials need to be preselected to provide enhanced electrolyte retention and oxidation resistance during the desired service life. Thus, as to the overall separator mat characteristics, the porosity preferably should be between about 87–94%; and the surface area should be between about 1.0 to 2.2 meter$^2$/gm. Also, the maximum pore diameter of the separator mat should be in the range of about 8 to 20$\mu$ and the mean pore diameter in the range of about 1.2 to 5.0$\mu$. In addition, the polymeric fibers should have a diameter of from about 1.1 to 5.0$\mu$; and any glass microfibers used preferably should have a diameter in the range of from about 0.3 to 5$\mu$.

As to composition, the microfiber mat can range from a hybrid polymeric-glass microfiber to an all-polymeric mat. In the event that a hybrid mat is utilized, it is preferred to utilize a polymeric microfiber content in the range of from about 40% to 85% by weight, the balance being glass microfibers.

The polymeric microfibers can utilize any of a wide range of polymers. The principal criteria include oxidation resistance and thermal and electrochemical stability throughout the expected service life. Suitable illustrative polymers include polyesters, such as polyethylene terephthalates (good heat stability, such as those having a melting point of about 265° C.), polyolefins (e.g., polypropylenes stable up to about 121° C.), polyacrylics containing up to 85% by weight polyacrylonitrile (various commercially available materials include Orlon™, Dynel™, Modacrylic—good thermal stability up to 185° C.), ethylene-propylene copolymers (particularly copolymers including EPDM and antioxidants—stable up to 126° C.), polyphenylenesulfides (amorphous grades having good thermal stability are available—melting point 285° C.), segmented polyester-polyurethane thermoplastics (e.g., Spandex™ thermoplastics), and segmented polyurethanes. Blends of two or more polymeric fibers may be utilized, if appropriate or desired in the separator mat.

Pursuant to one aspect of the present invention, the polymeric fibers employed should have a contact angle with sulfuric acid of no more than 1.5°, so as to provide the desired electrolyte wettability. Typically, adequate wettability is achieved by modifying the polymeric fibers so as to provide fibers with satisfactory contact angles to the sulfuric acid electrolytes used.

Modification to provide polymeric fibers with the appropriate wettability can be achieved by any technique desired. It is thus suitable to incorporate agents into the polymer mix prior to forming the fibers. Alternatively, the polymer fibers can be treated after formation. Still further, the resulting fiber mat can be treated.

More particularly, before the fibers are spun, suitable additives that can be included in the polymer melt include fumed silica, microglass spheres, and sodium silicates or other borosilicates. As an illustrative example, fumed $SiO_2$ having a particle diameter of 0.2 to 0.3$\mu$ and a surface area of about 90 to 380 meter$^2$/gm is suitable. Fumed silica can be added to the polymer up to a weight fraction in the range of 0.2–10.0%, based upon the total weight of the polymer prior to making polymeric fibers.

The formed polymeric fibers can be treated by depositing thereon fumed silica or any of the other additives previously identified. In this connection, the polymeric fibers may be treated with coupling agents to enhance the polymer-silica bond. An illustrative example of suitable coupling agents are silanes, e.g., vinyl trimethyloxysilane. Alternatively, the polymeric fibers may be surface coated by known CVD (viz., vapor deposition) techniques, gas phase reactions or solution precipitation, e.g., as may be obtained from a reaction of a silicate or borosilicate such as sodium silicate with Ca, Mg, Sr, or Ba ions or with sulfuric acid.

Further, the polymer fibers can be cross-linked or grafted with suitable organic or inorganic agents providing stable hydroxyl groups, hydrogen-bonded groups, or —$SO_4$ groups at levels adequate to achieve the necessary contact angle to the sulfuric acid electrolyte.

As an optional processing step, the polymeric fiber surface can be treated to enhance bonding at the molecular level or the like. As examples of suitable surface treatment techniques, texturing of the fiber surfaces can be carried out.

Lastly, the polymeric microfiber mat can be processed through a tank or other vessel, containing a solution of a suitable additive, such as silica, sodium silicate, or metasilicate, an alkaline earth metal ion, or sulfuric acid.

The resulting hybrid or polymeric microfiber mat separators possess not only improved handleability, processability, and reliability and durability in service, but also have higher resilience and spring-back characteristics. Further, and importantly, superior thickness stability under varying magnitudes of separator compression and acid saturation are achieved.

Multilayered separators may be utilized for applications requiring the use of very thick separators, with a thickness in the range of 0.060–0.150 inches. Separator resiliency can be enhanced if a two- or three-multilayer mat can be produced.

A two-thickness multilayered mat can be produced by wet laying two specific formulations of materials. One layer will be built with all glass microfibers while the other layer can be made of a mixture of treated polymeric fibers (40–80%) and the balance with 20–60% glass microfibers. For large capacity (7500 AH), tall cells (greater than 12 inches), it may be desirable to use a three-layer separator. In this embodiment, the separator comprises two outside layers made of glass microfibers and one thicker inside layer with either all polymeric or a blend of polymeric and glass microfibers. The thickness of the outside layers can be in the range of 20–40% of the total separator thickness, while the remaining central layer will have the balance of thickness (60–80%). Physical strength and resiliency of the three-layered separator will be greater than that of a single-layer separator thickness. These separators will also retain overall separator compression much better due to the presence of the central polymeric mat.

Figure 2:
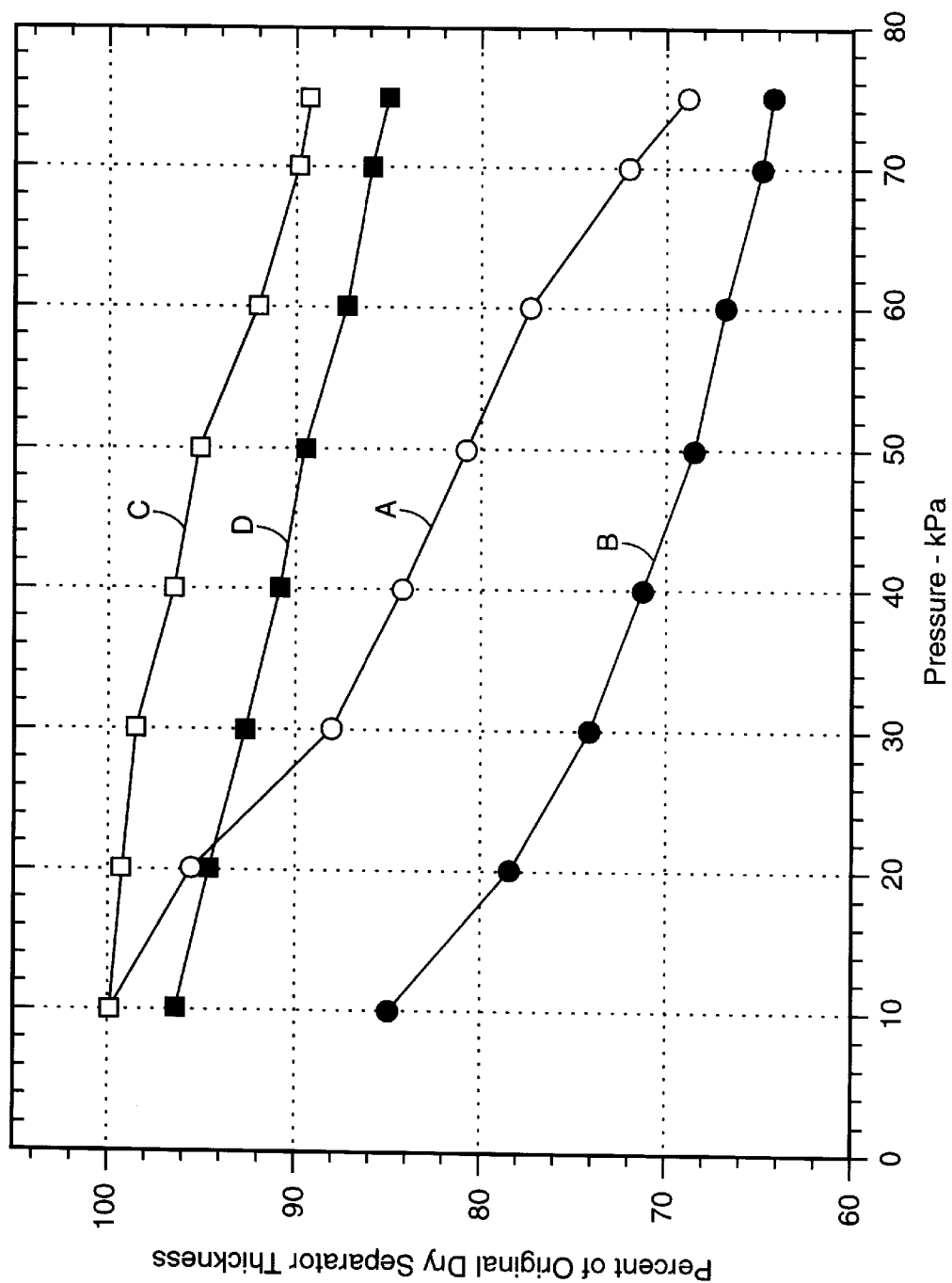
FIG. 2 is a graph of separator thickness versus pressure, showing the effect of applied compressive force on the separator thickness.

FIG. 2 thus illustrates the estimated performance benefits under both dry- and acid-saturated conditions utilizing the polymeric separators in comparison to the performance achieved by conventional glass microfiber separators. The BET surface area for each type is 1.1–1.3 m²/g, and the dry separator thickness is measured at 10.3 kPa (1.5 psi) for the glass microfiber separator. The thickness stability that it is believed can be achieved using the present invention is apparent. Thus, plots A and B (representing, respectively, the thickness of a conventional glass separator, dry and saturated with sulfuric acid, as the compressive pressure is increased) show that the thickness relative to the uncompressed dry thickness decreases significantly with increasing compressive pressure. Lines C and D are estimates as to what would occur using a polypropylene separator, as the compressive pressure is increased, under dry conditions (C) and then, when acid-saturated. It is expected that the use of a separator according to the present invention should result in less compression than occurs when using conventional glass microfiber separators.

Separator thickness stability reflects the ability to maintain cell compression throughout the service life. Typically, in glass microfiber separators, as the cell compression increases, the pore diameter and the separator thickness decreases. In a multilayered separator with modified polymeric fibers, the rate of pore diameter reduction and separator thickness reduction as a function of compression will be reduced. The polymeric fibers are more resilient and also do not break under compression, unlike all glass microfiber mater separators.

While the present invention has been described in conjunction with VRLA cells and batteries, it should be appreciated that the present invention can be utilized in any other cell or battery system in which the hybrid or plastic microfiber separators are useful, such as in bipolar cells and batteries.

I claim:

1. A sealed, lead-acid cell comprising a container, at least one positive plate and a negative plate disposed within said container, a separator disposed within said container and separating said positive and negative plates, and an electrolyte substantially completely absorbed in said separator and plates, said separator comprising a microfiber mat having at least two layers and a thickness in the range of 0.060 to 0.150 inches, at least one layer being glass microfibers having a diameter of about 0.3 to 5.0$\mu$ and another layer comprised of about 40% to 80% by weight of plastic microfibers having a contact angle of no more than 1.5° to said electrolyte and a diameter of about 1.1 to 5.0 $\mu$ and the balance being said glass microfibers, said separator having a porosity of about 87% to 94%, a surface area of about 1.0 to 2.2 meters²/gm, and a maximum pore diameter of about 8 to 20$\mu$ and a mean pore diameter of about 1.2 to 5.0$\mu$.

2. The cell of claim 1 wherein said cell has a capacity of at least 7500 Ampere Hours and said separator comprises three layers wherein said another layer is a central layer comprising about 60% to 80% of the thickness of said separator and the other two layers being outside of, and adjacent to, said central layer and being of said glass microfibers.

* * * * *